United States Patent Office 3,759,844
Patented Sept. 18, 1973

3,759,844
CATALYST FOR CATALYTIC CRACKING OF HYDROCARBONS
Goro Yamaguchi, 1554 Tsuda-machi, Kodaira-shi, Tokyo, Japan; and Susumu Komatsu, 1099 Uraimbe, Bizen-cho, Wake-gun; and Tetsuo Fukumoto, 783 Uraimbe, Bizen-cho, Wake-gun, both of Okayama-ken, Japan
No Drawing. Filed Mar. 29, 1971, Ser. No. 129,177
Claims priority, application Japan, Oct. 2, 1970, 45/85,908
Int. Cl. B01j 11/12, 11/22
U.S. Cl. 252—465                        1 Claim

ABSTRACT OF THE DISCLOSURE

A catalyst or catalyst carrier for side reactions of catalytic cracking of hydrocarbons essentially consisting of an alkali polyaluminate selected from the group consisting of $\beta$-alumina ($R_2O \cdot 11Al_2O_3$), $\beta'$-alumina ($R_2O \cdot 7\text{-}8Al_2O_3$), and $\beta''$-alumina ($R_2O \cdot 5\text{-}6Al_2O_3$) wherein R is Na or K, respectively, and a catalyst or a catalyst carrier of a mixture for side reactions of catalytic cracking of hydrocarbons which essentially consists of at least 1% by weight of said alkali polyaluminate and a refractory inorganic material.

---

Ths invention relates to a catalyst or a catalyst carrier for side reactions of catalytic cracking of hydrocarbons.

It has been described in detail, in the copending patent application No. 24,543, now U.S. Pat. 3,694,379, that in case when alkali polyaluminates are employed for catalytic cracking of hydrocarbons, ethylene can be obtained with high yield, further, deposition of carbon on the catalyst can be inhibited owing to the selectivity of the catalyst for oxidation reaction, thus a gas having a satisfactory composition as high calorific town gas, can be obtained. Wherein, said alkali polyaluminates are those selected from the group consisting of $\beta$-alumina ($R_2 \cdot O11Al_2O_3$), $\beta$-alumino ($R_2O \cdot 7\text{-}8Al_2O_3$) and $\beta''$-alumina $$(R_2O \cdot 5\text{-}6Al_2O_3)$$

in which R is Na or K.

Furthermore, the present inventors have found that when said polyaluminates or mixtures consisting of at least 1% by weight of alkali polyaluminates calculated as $K_2O$ or $Na_2O$, and refractory materials, are employed as catalyst or catalyst carrier in secondary or side reactions such as hydrogenation, dehydrogenation, isomerization, cyclization, and condensation arising in catalytic cracking, the deposition of carbon on the catalyst can be prevented, and said catalyst and carriers have excellent selectivity with respect to the secondary or side reactions.

That is, in these secondary or side reactions, since carbon is liable to deposit on a catalyst in the course of the reactions, the reaction conditions such as reaction temperature and ratio of raw materials are very strictly controlled in order to prevent the deposition of carbon. It is, however, difficult to prevent perfectly the carbon from depositing, therefore activity of the catalyst is declined, accordingly there are many cases required for a regenerating operation of the catalyst for making the deposited carbon off.

However, since the regenerating operation of the catalyst is to remove deposited carbon, it is liable to cause abnormal temperature elevation of the layer of the catalyst. Accordingly, it leads not only to deteriorating activity of the catalyst, but also an accident due to the deterioration occurs, as the result, the rate of operation of a reaction furnace is remarkably reduced, and in addition to that, the above-mentioned regenerating operation is a very troublesome one.

As mentioned above, the alkali polyaluminates inhibit remarkably the deposition of carbon by the action of the alkali metals as contained, and the velocities of decomposition and volatilization of alkali metals are very slow. Therefore, the alkali polyaluminates according to this invention have characteristic features such that the speed of deteriorating the activity of the catalyst accompanied with alkali volatilization, which being a disadvantage of conventional catalyst, is slow and that the life of the catalyst is considerably long. Furthermore, it has been found that excellent selectivities with respect to each reaction can be afforded on the alkali polyaluminates by causing to support a suitable catalyst substance, for example, chromium, tungsen, molybdenum, iron, cobalt, nickel, copper, platinum, palladium, iridium, ruthenium, rhodium, and osmium in the form of an element, a compound, or a mixture. Accordingly, when the alkali polyaluminates are employed for catalysts or carriers, there is no necessity of regeneration of the catalysts such as baking off of deposited carbon as mentioned above, the rate of operation of a reaction furnace can be elevated, and furthermore, an excellent catalyst having a long life and which makes possible to carry out a very economical, stable, and safe operation for a long period of time can be expected.

In order to show still more clearly the nature and utility of the invention, the following specific examples constituting preferred embodiments of the invention and results are set forth. It being understood that these examples are presented as illustrative only, and that they are not intended to limit the scope of the invention.

EXAMPLE 1

To a ferric sulfate aqueous solution, a copper sulfate solution was added, then, a fine powder $$\beta''\text{-}Al_2O_3(K_2O \cdot 5\text{-}6Al_2O_3)$$

and of MgO were added thereto, further, a precipitation obtained by adding ammonia to the above mixture was filtered and washed with water, and was heated at a temperature of 650° C., thereafter, thus treated mixture was molded into tablets to prepare a catalyst having a composition of $$MgO:\beta''\text{-}Al_2O_3:Fe_2O_3:CuO = 40:32.8:18.2:4.5$$

As a result of dehydrogenation of butene by employing the above obtained catalyst under the conditions of a reaction temperature of 650° C., a gas space velocity of 800 (vol./vol./hr.) and steam/butene of 15 (kg./l.), respectively, the following results were obtained.

Conversion (mol percent) _____ 63.2
Selectivity (mol percent) _____ 80
Yield (percent) _____ 50.6 wherein, $$\text{Conversion} = \frac{\text{Converted butene, mol}}{\text{Raw material butene, mol}} \times 100$$

$$\text{Selectivity} = \frac{\text{Produced butadiene, mol}}{\text{Converted butene, mol}} \times 100$$

and $$\text{Yield} = \text{Conversion} \times \text{selectivity}$$

On the other hand, in the case when a conventional catalyst on the market was employed under the same conditions as mentioned above, the following results were obtained.

Conversion (mol percent) _____ 42
Selectivity (mol percent) _____ 70
Yield (percent) _____ 29.4

In the latter case, regeneration was necessary for every 30 minutes cycle, but in the case of employing the catalyst according to this invention, there was no necessity of regeneration, and even when a continuous operation was carried out for 20 hrs., there was no change in the yield of butadiene, further the deterioration of activity of the catalyst was not observed after employing the catalyst for 2000 hrs.

EXAMPLE 2

$\beta'$-$Al_2O_3$($K_2O \cdot 7$-$8Al_2O_3$) powder was molded into pellets and were baked at a temperature of 1450° C. to prepare a carrier. Hexachloroplatinic acid solution was caused to impregnate into the resulting carrier and was baked at a temperature of about 600° C. to prepare a catalyst having a ratio of Pt:$\beta'$-$Al_2O_3$=1.0:99.0.

When dehydrogenation and condensation reaction of butane-ammonia was carried out by employing the catalyst thus obtained and a raw material having a ratio of oxygen:ammonia:methane=1.50:1.00:1.08 at a reaction temperature of 1000° C., the yield of prussic acid HCN[(HCN mol/$NH_3$ mol)×100] was 92%.

EXAMPLE 3

When 2,3 - dimethylbutene-2 ($R_2C$=$CR_2$ olefin, R is alkyl group) was subjected to reaction by employing $\beta''$-$Al_2O_3$ under the condition such that a reaction temperature being 230° C., and a gas space velocity being 1 vol./vol./hr., respectively, the following isomerization products were obtained.

| Type of olefin: | Volume (percent) |
|---|---|
| R—CH=$CH_2$ | 0 |
| R—CH=CH—R | 25 |
| $R_2C$=$CH_2$ | 20 |
| $R_2C$=CH—R | 50 |
| $R_2C$=$CR_2$ | 5 |

EXAMPLE 4

Into a mixed solution of copper nitrate and iron nitrate (tri- or divalent), $\beta$-$Al_2O_3$($K_2O \cdot 11Al_2O_3$) fine powder was added and blended by stirring them, and potassium carbonate was added thereto to separate a precipitate. The resulted precipitate was filtered, washed, and dried to prepare a catalyst having a composition of Fe:Cu:$\beta$-$Al_2O_3$=100:5:50.

When thus obtained catalyst was employed in Fischer-Tropsch synthesis under the condition such that a reaction pressure being 10 kg./cm.², a reaction temperature 200–230° C., a space velocity 400 lit. gas/kg. Fe, and $H_2$/CO=0.85, the following results were obtained:

Yield (g./m.³·CO+$H_2$): 150 gr. liquid substance and 15 gr. gaseous hydrocarbon
Gasoline (<200° C.): 55% (olefin content 30%)
Middle oil (200–300° C.): 30%
Gas oil (300–400° C.): 10%
Heaviers (>400° C.): 5%

The catalyst employed in the above-mentioned reaction could be used for about 2 years without any regeneration.

EXAMPLE 5

Into chromium nitrate solution, $\beta''$-$Al_2O_3$($K_2O \cdot 5$-$6Na_2O_3$)

fine powder was added, and further, $K_2CO_3$ was added thereto while stirring them, thereby to separate a precipitate. Thus obtained precipitate was filtered, washed, and dried, then, was molded into tablets to prepare a catalyst having a ratio of Cr:$\beta'$-$Al_2O_3$=1:9.

When cyclization reaction of 2-ethylhexene 1 was carried out by employing thus prepared catalyst under the condition such that a space velocity being 0.11 vol./vol./hr. and a reaction temperature being 500° C., the following results were obtained.

| | |
|---|---|
| Yield of liquid (percent) | 48 |
| Aromatics (percent) | 91.0 |
| Olefins (percent) | 7.2 |
| Paraffins (percent) | 1.8 |

EXAMPLE 6

Into a mixed solution of nickel salt, cobalt salt, and molybdenum salt, $\beta''$-$Al_2O_3$($K_2O \cdot 5$-$6Al_2O_3$) fine powder was added and blended, further, $K_2CO_3$ was added thereto while stirring them to separate out a precipitate. The resultant precipitate was filtered, washed, dried, and then, was molded into pellets to prepare a catalyst having a composition of nickel:cobalt:molybdenum:$\beta''$-$Al_2O_3$=2:2:8:88.

The results of direct hydrodesulfurization by employing thus prepared catalyst were as follows.

Condition of operation:
| | |
|---|---|
| Reaction temperature (° C.) | 350–370 |
| Reaction pressure (kg./cm.²) | 40 |
| Space velocity (vol./vol./hr.) | 2 |
| $H_2$/oil (m.³/l.) | 2–2.5 |

| | Raw oil | Produced oil |
|---|---|---|
| Specific gravity (15° C./4° C.) | 0.9296 | 0.9139 |
| Pour point (°C.) | +10.0 | |
| Residual carbon component (wt. percent) | 6.74 | |
| Sulfur component (wt. percent) | 1.90 | 0.178 |
| Desulfurization (percent) | | 91 |

After continuous operation for 2000 hrs., deposition of carbon on the catalyst and deterioration of catalytic activity were scarcely observed.

What is claimed is:

1. A catalyst for promoting hydrocarbon reactions such as hydrogenation, dehydrogenation, isomerization, cyclization and condensation, said catalyst comprising (1) an alkali metal polyaluminate having the formula $R_2O \cdot 7$-$8Al_2O_3$ or $R_2O \cdot 5$-$6Al_2O_3$, wherein R is sodium or potassium, and (2) at least one elemental metal selected from the group consisting of chromium, tungsten, molybdenum, iron, cobalt, nickel, copper, platinum, palladium, iridium, ruthenium, rhodium and osmium.

References Cited

UNITED STATES PATENTS

| | | | |
|---|---|---|---|
| 2,422,172 | 6/1947 | Smith | 196—50 |
| 2,454,227 | 11/1948 | Smith | 252—434 |
| 3,426,066 | 2/1969 | Dombro | 260—540 |

OTHER REFERENCES

"On the Structure of Alkali Polyaluminates," Yamaguchi et al., Bulletin of Chem. Soc. of Japan, January 1968.

DANIEL E. WYMAN, Primary Examiner

W. J. SHINE, Assistant Examiner

U.S. Cl. X.R.

252—463, 466 J, 466 Pt, 466 B

UNITED STATES PATENT OFFICE
CERTIFICATE OF CORRECTION

Patent No. 3,759,844   Dated September 18, 1973

Inventor(s) Goro Yamaguchi, Susumu Komatsu, Tetsuo Fukumoto

It is certified that error appears in the above-identified patent and that said Letters Patent are hereby corrected as shown below:

Column 1, line 27 - "Ths" should be --This--

Column 1, lines 39 and 40

"$\beta$-alumino($R_2O \cdot 7$-$8Al_2O_3$) and $\beta$"-alumina ($R_2O \cdot 5$-$6Al_2O_3$)"   should be --$\beta$'-alumina ($R_2O \cdot 7$-$8Al_2O_3$) and $\beta$"-alumina ($R_2O \cdot 5$-$6Al_2O_3$)--

Column 1, line 61 - "making" should be --baking--

Column 2, line 13 - "tungsen" should be --tungsten--

Column 3, line 64 - "$\beta$"-$Al_2O_3$($K_2O \cdot 5$-$6Na_2O_3$)" should be --$\beta$"-$Al_2O_3$($K_2O \cdot 5$-$6Al_2O_3$)--.

Column 4, after line 53, insert the following claim:

2. A catalyst for promoting hydrocarbon reactions such as hydrogenation, dehydrogenation, isomerization, cyclization and condensation, said catalyst comprising an alkali metal polyaluminate having the formula $R_2O \cdot 7$-$8Al_2O_3$ or $R_2O \cdot 5$-$6Al_2O_3$, wherein R is sodium or potassium, and at least one compound of a metal selected from the group consisting of tungsten, molybdenum and copper, said compound formed from drying aqueous salt solutions of said metals.

Signed and sealed this 20th day of August 1974.

(SEAL)
Attest:

McCOY M. GIBSON, JR.
Attesting Officer

C. MARSHALL DANN
Commissioner of Patents